July 9, 1940.   C. B. HALE   2,207,290
GEAR WHEEL
Filed Sept. 22, 1938
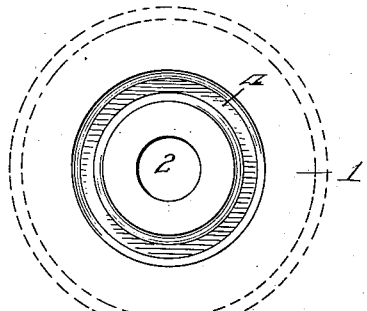
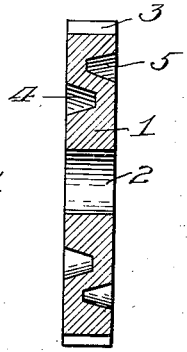
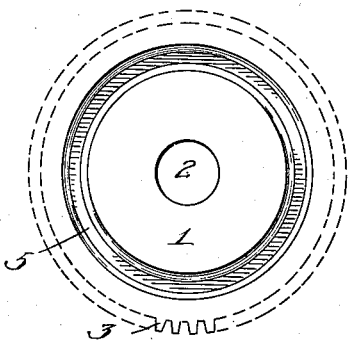
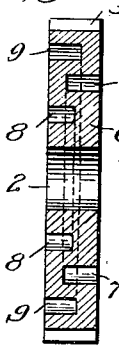
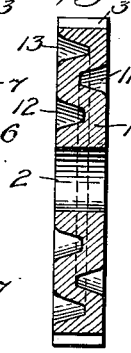
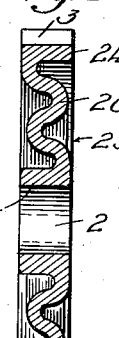
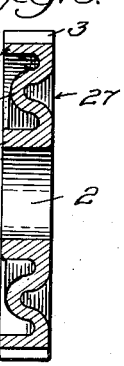
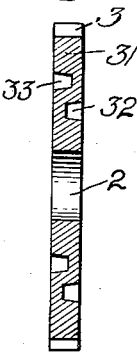
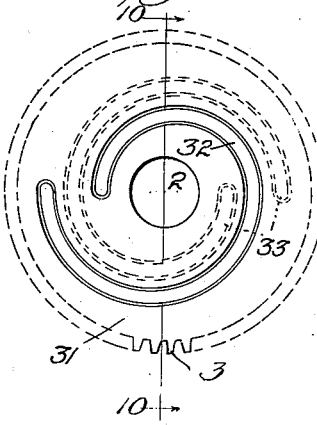
Inventor:
C. B. Hale,
by Wm. F. Freudenreich,
Atty.

Patented July 9, 1940

2,207,290

UNITED STATES PATENT OFFICE 2,207,290

GEAR WHEEL

Charles B. Hale, Chicago, Ill., assignor to Gear Specialties, Incorporated, a corporation of Illinois Application September 22, 1938, Serial No. 231,128

1 Claim. (Cl. 74—443)

When meshed gear wheels are running at high speeds, they generate a sound or noise through the clashing of the gear teeth. While the sound produced by cooperating gear wheels cannot, perhaps, be eliminated entirely, if the pitch of the sound can be controlled, the objectionable effect of the sound may, at least, be reduced to a minimum. In the case of phonographs, for example, the usual gear wheels emit a high pitched sound when running. However, the motor, at the same time, produces a constant hum of lower pitch. The sound produced by the gear wheels is discernable above the hum of the motor. If the sound produced by the running gear wheels can be caused to have the same pitch as the hum of the motor, then when the sound of the mechanism as a whole is picked up by a sensitive microphone, for example, that sound produced by the gear wheels does not stand out as an interfering or discordant element; and, since the pitch of the sound produced by the motor is low and is not seriously objectionable, the objection to the noise produced by the gear wheels may be said, in effect, to be eliminated.

The object of the present invention is to make it possible to control the pitch of the sound produced by a gear wheel running in mesh with the companion gear wheel and, particularly, to lower the pitch.

The pitch of the sound produced by a gear wheel running in mesh with another gear wheel depends upon the length of the path which vibrations must follow from the shaft or hub of the wheel to the periphery, within the material of which the gear wheel is composed. The length of this path in the case of a plain disc wheel or ordinary spoked wheel is the radial length or distance between the hub or shaft and the rim. In accordance with my invention, I make it possible to increase the length of the aforesaid path beyond such mere radial dimension, and thus bring about a lower rate of vibration for a given wheel diameter, and a consequent lower pitch in the note or sound emitted. This may be accomplished in various ways, as long as any plane at right angles to the axis of the wheel does not pass continuously through the material of which the wheel is composed but meets voids that interrupt all radial paths through solid portions of the wheel.

The various features of novelty whereby my invention is characterized will hereinafter be pointed out with particularity in the claim; but, for a full understanding of my invention and of its objects and advantages, reference may be had to the following detailed description taken in connection with the accompanying drawing, wherein:

Figure 1 is a central axial section through a gear wheel embodying my invention in one of its forms; Figs. 2 and 3 are views illustrating the opposite faces of the gear wheel of Fig. 1, only a few of the gear teeth being shown; Figs. 4, 5 and 6 are views similar to Fig. 1, each showing a somewhat different arrangement for the same type of wheel as in Fig. 1; Fig. 7 is a view similar to Fig. 1, illustrating a wheel that may be stamped from sheet metal; Figs. 8 and 9 are views similar to Fig. 1, showing two somewhat different forms of a type of wheel including a hub, rim and corrugated center between the hub and rim; Fig. 10 is a central axial section through a wheel similar to that of Figs. 1 and 2, but having spiral grooves; Fig. 11 is a side view of the wheel shown in Fig. 10; and Figs. 12, 13 and 14 are views similar to Fig. 10, showing three different forms of the same general type of wheel wherein there is a sheet metal center around which is fitted a toothed rim.

Referring to Figs. 1, 2 and 3 of the drawing, 1 represents a thick disc having a central opening 2 for a shaft and peripheral gear teeth 3. In each side or face of the disc is a deep annular groove or trough concentric with the axis of the wheel. One of the annular grooves or troughs 4 is of relatively small diameter so that the material surrounded by the same may be said to constitute a hub; while the other groove or trough 5 is of larger diameter so as to lie between the groove or trough 4 and the periphery and lie close enough to the latter to give the material of the disc lying outwardly from the same the appearance of a rim. In order that no radial line extending from the shaft opening 2 to the periphery of the wheel shall pass only through the metal or other material of which the disc is composed, the combined depths of the two grooves or troughs must be greater than the thickness of the disc. In the arrangement shown, the two grooves or troughs are of the same depth, which depth is greater than one-half the thickness of the disc. Consequently, the length of any line extending from the shaft opening to the base of the gear teeth without crossing either or both of the two voids produced by the two troughs, is considerably greater than the direct radial distance between the same points. The effect on the sound produced by the running gear wheel in mesh with a cooperating wheel is the same as that of lengthening the string in a musical instrument, namely, the lowering of the rate of vibration and the lowering of the pitch.

In Fig. 1 there are only two troughs and both are V-shaped, although flattened at the bottoms. In Fig. 4 the wheel 6 has three troughs, a single trough 7 on one side, and two troughs 8 and 9, respectively, on the other side. The trough 8 lies close to the shaft opening 2 and the trough 9 close to the periphery, whereas the trough 7 is shown as lying midway between the troughs 8 and 9. All three of the troughs are shown as having parallel side walls. Also, the troughs 7, 8 and 9 are not all equal in depth; the troughs 7 and 9 being about equal in depth and each being considerably deeper than one-half the thickness of the disc, while the trough 8 is shallower; thereby giving the effect of a wheel center that decreases in thickness from the hub toward the rim.

In Fig. 5 the wheel 10 contains three troughs 11, 12 and 13 similar to the troughs 7, 8, and 9 and similarly located; the difference being that the troughs are shaped more like those in Fig. 1, although the sides of the troughs are curved adjacent to the face of the wheel to produce rounded corners.

In Fig. 6 the wheel 14 has three troughs 15, 16 and 17 distributed as in Fig. 4, but all of the same depth and so shaped that the sides thereof form sharp corners with the faces of the wheel, while the bottoms are rounded.

In Fig. 7 there is illustrated a gear wheel 18 that may be pressed from sheet metal or metal plate, whereby the metal is of uniform thickness throughout. The metal of the wheel is deformed so as to produce in one side an annular trough 19 near the center of the wheel and on the other side a trough 20 that lies outwardly from the trough 19 and near the periphery. The deformation is considerable so that the annular ridge 21 created on one side of the wheel by the forming of the trough 19 in the other side, projects substantially outwardly beyond the initial plane of the sheet or plate, while the annular ridge 22 created in the making of the trough 20 extends the same distance beyond the original plane of the other side of the sheet or plate.

In Fig. 8 the gear wheel 23 has a wide rim 24 and a hub 25 of about the same width; the rim and the hub being connected by a wheel center 26 having several annular concentric corrugations which all lie between the planes of the edge faces of the hub and rim. It will be seen that the rim, the wheel center and the hub wall are all of about the same thickness.

In Fig. 9 the wheel 27 has a wide, fairly thin rim 28 and a thin-walled hub 29 of considerable diameter. The wheel center 30, in this instance, consists of an annulus 30, U-shaped in cross section, one side of the U being curved outwardly and joining the rim adjacent to one edge of the latter; while the other side of the U is curved inwardly or downwardly and joins the hub.

The wheel illustrated in Figs. 10 and 11 comprises a thick disc 31 having in each face a deep groove of the type illustrated in Figs. 1 and 2; these grooves being indicated at 32 and 33 and being in the form of similar spirals displaced one hundred and eighty degrees relatively to each other.

In Fig. 12 the wheel comprises a toothed rim 34, L-shaped in cross section, and a cup-shaped wheel center 35 fitted into the rim; the parts being so arranged that the toothed arm or wing of the L-shaped rim lies at right angles to the axis of the wheel and at one side of the wheel, whereas the member forming the bottom wall of the cup lies at the opposite side of the wheel. In this form, also, the wheel center is provided with a sleeve-like hub 36 struck up therefrom and extending across the interior of the wheel.

In Fig. 13 the wheel comprises a rim 37, L-shaped in cross section, and a cup-shaped wheel center 38 having a hub 39 corresponding to the hubs 33 and 36 in other forms. The rim as a whole is narrower than that in Fig. 12, so that the horizontal flange on the rim may lie on the same side thereof as does the cylindrical side wall of the cup in the center member; but, since the cup is deeper than the width of the rim, the bottom wall of the cup and the toothed flange or wing of the rim are out of registration with each other.

In Fig. 14, the wheel comprises a toothed rim 40, L-shaped in cross section, and a shallow cup 41 forming the wheel center. The outer corner at the juncture of the two wings or flanges of the rim is rounded, as is the bottom corner of the cup. Consequently, even though the bottom wall of the cup and the toothed flange or wing on the rim are in substantial alignment, some of the radii extending from the shaft opening 2 through the rim pass through a void formed by the annular groove between the rounded shoulders on the rim and wheel center.

It will thus be seen that in all of the forms of wheels which I have illustrated, excepting that in Fig. 14, every radius extending from the shaft opening to the periphery passes through some empty spaces and therefore does not extend continuously through the metal or other solid material of which the wheel is composed, and thus I am able to obtain the same effect, insofar as sounds produced through vibration of a wheel while running at high speed in mesh with a cooperating wheel, as though the actual radius of the wheel were greater. In other words, the pitch of the sound produced by the running gear is lowered to an extent depending upon the degree to which the effective radius, so far as sound production is concerned, is increased. Even in Fig. 14, the radii throughout a considerable portion of the thickness of the web portion of the wheel intersect an empty annular space between the wheel center and the wheel rim, whereby some modification of the sound produced by the running wheel is effected.

While I have illustrated and described with particularity only a single preferred form of my invention, with a few modifications, I do not desire to be limited to the exact structural details thus illustrated and described; but intend to cover all forms and arrangements which come within the definitions of my invention constituting the appended claim.

I claim:

A gear wheel in the form of a thick disk provided with peripheral teeth, the disk having annular troughs extending into the same from opposite faces, the troughs and the disk being concentric, each trough being of a depth greater than one-half of the thickness of the disk, and the radii of the troughs differing in length from each other.

CHARLES B. HALE.